C. T. PFLUEGER.
THUMB BRAKE FOR FISHING REELS.
APPLICATION FILED NOV. 6, 1919.
1,379,692.
Patented May 31, 1921.
2 SHEETS—SHEET 1.
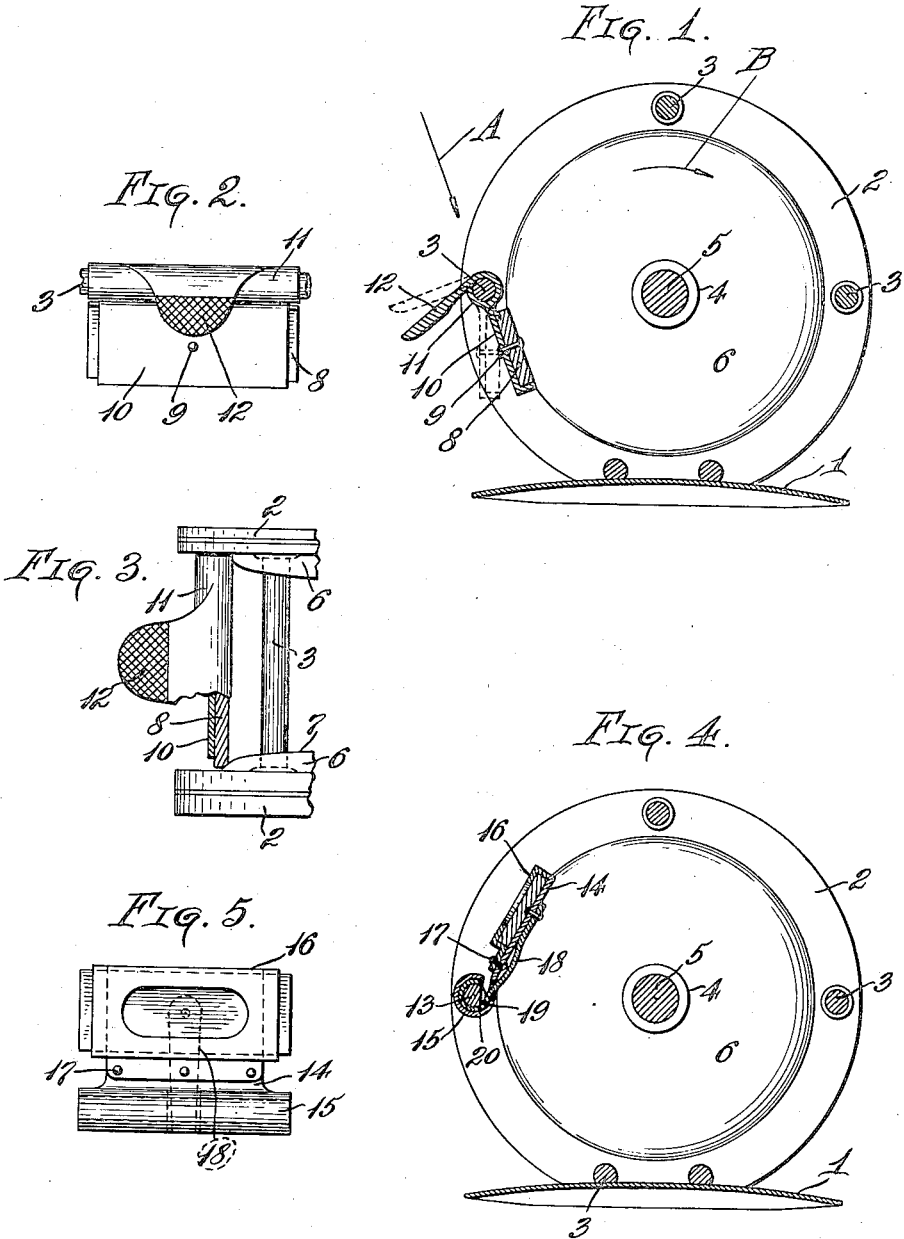

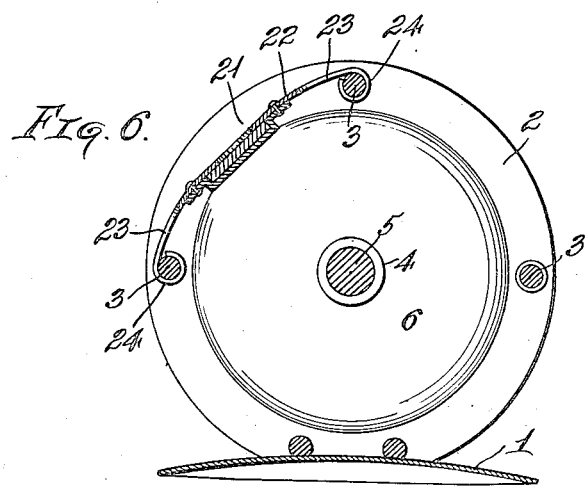
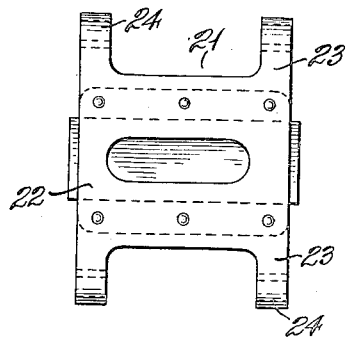
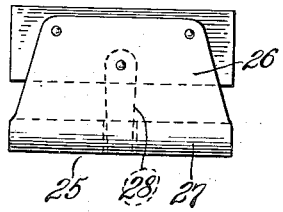
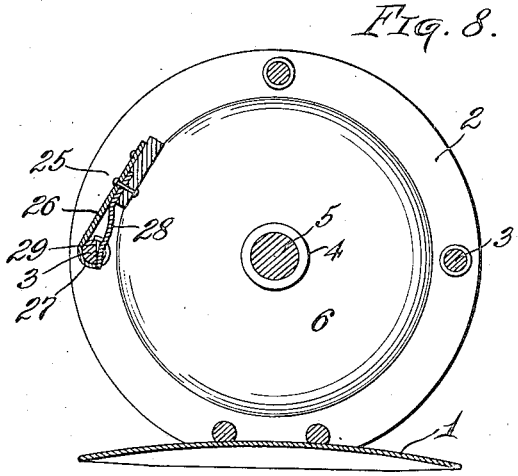

UNITED STATES PATENT OFFICE.

CHARLES T. PFLUEGER, OF AKRON, OHIO, ASSIGNOR TO THE ENTERPRISE MANUFACTURING COMPANY, OF AKRON, OHIO, A CORPORATION OF OHIO.

THUMB-BRAKE FOR FISHING-REELS.

1,379,692.   Specification of Letters Patent.   Patented May 31, 1921.

Application filed November 6, 1919. Serial No. 336,197.

*To all whom it may concern:*

Be it known that I, CHARLES T. PFLUEGER, a citizen of the United States, residing at Akron, in the county of Summit and State of Ohio, have invented certain new and useful Improvements in Thumb-Brakes for Fishing-Reels, of which the following is a specification.

This invention relates to fishing reel brakes, particularly to what are known as thumb brakes.

The object of the invention is to provide a more efficient thumb brake than those now in use, and more specifically a thumb brake arranged to exert its pressure directly upon the spool of the reel rather than upon the fishing line being wound thereon.

A further object of the invention is to provide a thumb brake which embodies a braking member which in action may be wedged into position between the two curved heads of the reel spool, so that maximum braking effect can be secured with minimum effort.

A further object of the invention is to provide a construction of this kind which can be made and applied to fishing reels at low cost, and which is not likely to get out of order in service.

Further objects of the invention are in part obvious and in part will appear more in detail hereinafter.

In the drawings, Figure 1 represents a sectional elevation illustrating the application of one preferred embodiment of my invention to a fishing reel; Fig. 2 is an elevation of the braking member and a part of the spool, looking into the direction of the arrow A, Fig. 1; Fig. 3 is a detail plan view, partially broken out and in section of the braking member. Figs. 4 and 5 are views corresponding to Figs. 1 and 2 and illustrating another embodiment of the invention; Figs. 6 and 7 are similar views illustrating still another modification; and Figs. 8 and 9 are similar views representing another modification.

Referring to the drawings, 1 indicates the base plate of a fishing reel, to wit, the plate by means of which the reel is attached to the fishing rod. The reel embodies the usual frame or cage comprising end plates or heads 2 solidly connected to each other by pillars or rods 3. In said frame is rotatably mounted the spool consisting of a hub 4 mounted upon a shaft 5 and carrying two end heads 6 of the usual form, having convex or curved inner faces 7. The line is wound upon the spool hub between the heads 6 and may be understood to pay out to leave the reel when the spool rotates in the direction of the arrow B, Fig. 1.

The brake forming the subject matter of the present invention comprises a braking member 8 held securely, such as by rivets 9, in the cavity or recess of a backing plate 10 having one edge portion bent or otherwise formed as a sleeve 11 surrounding one of the pillars 3, said sleeve being also provided with an outwardly extending thumb portion or ear 12 which may be roughened if desired. The braking member 8 may be made of any suitable material, such as leather, wood, or any other friction producing substance which will not injure the hollow metal surface of the spool head. Said braking member is rigidly supported except where it projects from the ends of the backing plate 10, as illustrated in Fig. 2 and its exposed end edges are adapted to contact with the curved faces 7 of the spool heads to exert the braking pressure. This arrangement avoids any possibility of contact of the backing member with the spool heads because of wear on the braking member and also provides slight yield or flexibility of the exposed end portions of the braking member, which therefore readily accommodates itself to the curved spool heads.

In use of the reel the brake normally hangs by gravity in the position shown in dotted lines, Fig. 1. If the line is being paid out to fish the operator presses down upon the thumb piece 12 so as to turn the brake around the pillar 3 as an axis, and apply the braking member 8 with pressure to the spool heads. Since said spool heads are curved the braking member in effect acts as a wedge, because it moves in between two converging surfaces. The effective braking pressure thereby increases rapidly with increase of thumb pressure, also the brake is effective upon the spool head at a point nearer to the axis of shaft 5 than the pillar 3, and as the spool is rotating in the direction of arrow B the rotation of said spool itself tends to further advance the braking member into wedging relation between the spool heads. When the braking effect is completed the thumb pressure is removed and the brake again drops by gravity to its initial position.

In the form shown in Figs. 4 and 5, the braking member is carried by a plate 14 having a sleeve 15 surrounding the pillar 13. Said braking member is inclosed within a sheet metal casing member 16 secured to the plate 14 by the rivets 17. To the back of the plate 14 is secured a spring metal strip 18 whose end portion lies opposite a recess or flattened portion 20 of the pillar 13. This brake is operated by direct application of thumb pressure to the casing member 16, which turns the brake in the clockwise direction Fig. 4 and advances the braking member into wedging relation between the spool heads, as before stated. During this motion the end portion 19 of the spring rides over the flattened portion 20 of the pillar of the circumference or outer surface of said pillar and is thereby placed under tension. The tension of this spring therefore always tends to release the brake when the thumb is removed therefrom.

In the form shown in Figs. 6 and 7 the braking member 21 is inclosed in a casing carried by a plate 22 having arms 23 provided with sleeve portions 24 surrounding two of the pillars 3. Plate 22 is of yielding or spring metal so that the brake can be pressed inwardly into braking relation with the spool heads, just as before and the resiliency of brake 22 retracts the brake to its initial position with its exposed end portion out of contact with the spool heads.

In the form shown in Figs. 8 and 9 the braking member 25 is a wooden member carried by the plate 26 having a sleeve portion 27 surrounding a pillar 3. This brake is also provided with a spring 28 whose end portion rides upon a flattened portion 29 of the pillar to retract the brake when desired.

What I claim is:—

The combination with the frame of a fishing reel and the rotating spool thereof, of a movable brake carried by said frame and adapted to be moved into braking engagement with the exposed surface of said spool, said brake having a rigid backing member which at its ends terminates short of the spool heads, and a braking member of friction material rigidly supported by said backing member and projecting beyond the ends thereof and adapted to be moved into wedging relation between the spool heads.

In testimony whereof I affix my signature.

CHARLES T. PFLUEGER.